United States Patent Office 3,402,116
Patented Sept. 17, 1968

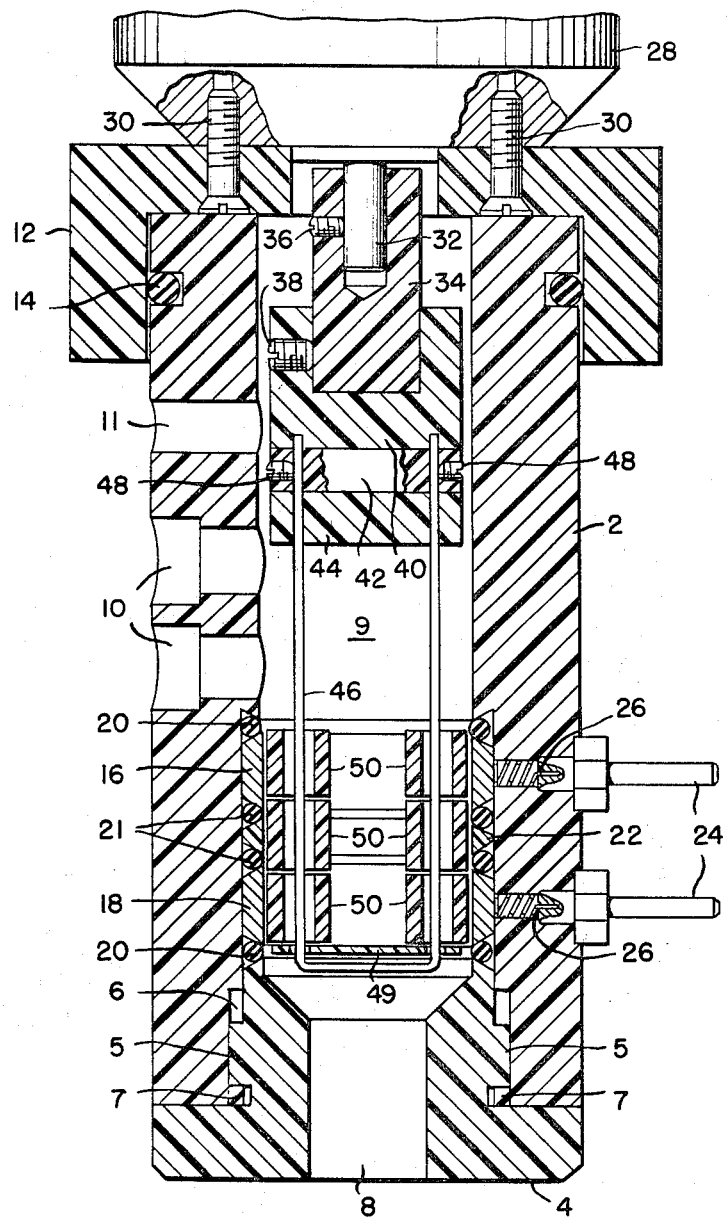

3,402,116
APPARATUS FOR THE MEASUREMENT OF RESIDUAL CHLORINE OR THE LIKE
Gerhart O. Kaltenhauser, Geismar, and Hermann Schweinsberg, Gottingen, Germany, assignors to Fischer & Porter Company, Warminster, Pa., a corporation of Pennsylvania
Filed Oct. 2, 1964, Ser. No. 400,977
Claims priority, application Germany, Oct. 12, 1963, F 40,974
1 Claim. (Cl. 204—195)

ABSTRACT OF THE DISCLOSURE

A chlorine measuring cell having coaxial cylindrical electrodes is provided with electrode cleaning rings, driven by a motor, and supported by a U-shaped fork.

---

This invention relates to an apparatus for the measurement of residual chlorine or the like.

In the treatment of water with chlorine or the like, it is often desirable to monitor the residual chlorine content continuously. This measurement is usually accomplished by the provision of a measuring cell at some point following the chlorination zone. The output of the monitoring device can be used either to provide direct readings of residual chlorine content or to control operation of the water treating equipment.

The principle upon which most residual chlorine measurements are based is the principle of depolarization to generate the electrical current. The measuring apparatuses ordinarily consist of passages for the flow of the chlorine-containing liquid, these passages having disposed within them two separate electrodes of different metals. A current responsive recording or indicating device is connected between the two electrodes. The combination of the two electrodes and the liquid flowing through this measuring device forms a galvanic cell. If there is no chlorine present in the water, current flow through the indicating device will be stopped or very considerably reduced by the buildup of a polarizing layer on the more noble metal electrode. Hypochlorous acid formed by the hydrolysis of chlorine in water is a strong oxidizing agent and will oxidize the polarizing layer permitting current to flow. The value of the electrical current indicated by the indicating device, considering the small quantities of chlorine ordinarily present in chlorinated water, is approximately proportional to the chlorine content. The use of such measuring devices is not limited to chlorine, but is also applicable in the measurement of residual iodine or chlorine peroxide, for example.

In order to make accurate measurements with measuring cells of this type, extreme cleanliness of the electrode surfaces contacting the liquid is required. Heretofore, cleaning of the electrodes in measuring cells was accomplished by providing small balls within the cell to be agitated by the flowing liquid. The rolling action of the balls against the electrode surfaces kept the surfaces clean. One disadvantage of this method is that the cleaning effect of the balls is highly dependent on liquid speed, i.e., at very low flow speeds no cleaning action whatever occurs. A second disadvantage with the ball method is that the inlet and outlet passages of the cell must be of such a diameter as not to permit the balls to escape. Since, for cleaning purposes, very small balls are used, the liquid inlet and outlet passages are consequently quite restricted and often become clogged by contaminants contained in the liquid.

Other measuring cells are known in which a stationary electrode is provided and in which a second electrode is rotatable by a motor. The rotation of the rotating element causes balls within the measuring cell to be thrown around in the space between the two electrodes so that cleaning of both of the electrodes is accomplished. Alternatively, the motor driven element forces the liquid into contact with the electrodes in a turbulent motion, the balls contained within the cell following the liquid and, consequently, striking the electrodes in such a fashion as to cause them to be cleaned.

In the two last-mentioned arrangements the aperture of the inlet and outlet passages of the cell is limited by the size of the balls. Furthermore, with both arrangements the flow of the liquid can be hindered by the rotating elements, and, again, the cleaning effect is dependent on the speed of flow of the liquid. With the rotating electrode arrangement, brushes or slip rings are required, thus considerably increasing the cost and the complexity of construction of the device.

The principal object of this invention is to provide an electrical measuring cell having an improved means for maintaining the electrode surfaces in a clean condition.

A further object is to provide a cell which is simple and inexpensive to manufacture and which requires a minimum of expensive parts.

A still further object of the invention is to provide an electrical measuring cell having a cleaning means for its electrodes, the effectiveness of which cleaning means is not dependent on the rate of flow of the liquid to be measured.

The foregoing objects and other objects will become apparent from the following description when read in conjunction with the accompanying drawing in which:

The single figure is a cross-sectional view of a measuring cell in accordance with the present invention.

A cylindrical housing 2 is shown partially closed at its lower end by a cap member 4. Member 4 is held in position by a pair of locking portions 5 resting on the lower edge of groove 6 in housing 2. The groove 6 has a pair of vertical openings 7 (designated by dashed lines) to the bottom of housing 2 for the passage of locking portions 5 during the insertion of the cap member 4. The cap member can then be inserted and rotated through a portion of one revolution to cause it to lock in position by engagement of portions 5 with the lower edge of groove 6. Cap member 4 is provided with a large inlet passage 8 which opens the exterior of the cell to the interior 9 of housing 2. Housing 2 is provided with two outlet passages 10. An overflow passage 11 is provided in order to prevent liquid from reaching the upper part of the interior of the housing.

The upper end of housing 2 is closed partially by a cup-shaped member 12 and a seal is provided by means of O-ring 14.

A first cylindrical electrode 16 is provided in a groove in the inner wall of housing 2. A second electrode 18 is provided at a lower position in this groove. Electrodes 16 and 18 are necessarily of different metals. A combination which has been found to be satisfactory is copper and gold. An upper insulating O-ring 20 separates electrode 16 from the upper edge of the groove in which it rests, and a similar O-ring separates electrode 18 from the lower edge of the groove defined by cap member 4. O-rings 21 separate the respective electrodes from a ring member 22 disposed between them. The entire assembly comprising electrodes and rings within the groove in housing 2 is compressed against the upper edge of the groove by cap member 4 by virtue of the locking engagement of locking portion 5 with groove 6. Electrical contact terminals 24 are provided extending through housing 2 and maintained in positive electrical contact with electrodes 16 and 18 by virtue of the compressed springs 26.

An electrical motor 28 is fixed to member 12 by means of screws 30. Its shaft 32 extends through member 12 and into the interior 9 of housing 2. A cylindrical member 34 is fixed to shaft 32 by means of a set screw 36, and set screw 38 holds a larger cylindrical member 40 on member 34.

A clamping member 42 is fastened below member 40, and another clamping member 44 is fastened below member 42. The prongs of fork member 46 of spring stainless steel extend through member 44 and are clamped by set screws 48 in clamping members 42. A flat-topped plate 49, preferably having a small surface area so that it will permit flow of liquid through passage 8, is provided resting on the horizontal portion of fork 46. The vertical portions of fork 46 pass through holes in plate 49. A set of cylindrical rings 50, which may, for example, be formed from glass, ceramic material or plastic, are provided on the prongs of fork 46 and are positioned so that the lower pair of rings rests on plate 49 and is aligned with electrode 18 and the upper pair of rings is aligned with electrode 16. The middle pair of rings is used merely to separate the upper and lower pairs.

It will be apparent that the various members comprising the housing and the clamping members supporting fork 46 from the motor shaft 42 should be made of an insulating material such as plastic or the like. The only parts of this invention which are necessarily metal are the electrodes, terminals 24 and springs 26.

Liquid flowing through passage 8 into the interior 9 is able to come in contact with electrodes 16 and 18 at all points on their inside surfaces except for the area of contact between the rings and the electrode surfaces. A current measuring device connected between terminals 24 can then be used to determine the amount of oxidizing material contained within the liquid.

In operation, if shaft 32 rotates, fork 46 rotates with it and rings 50 are forced outwardly against the cylindrical electrodes 16 and 18. Since the rings 50 fit loosely on the prongs of the fork, the force with which they engage the electrodes is dependent on the speed of rotation of the motor shaft. The continuous rolling action of the rings against the electrodes tends to keep the electrodes clean, thus improving the accuracy of measurement.

It will be apparent that the cleaning effect of the rollers is independent on the rate of flow of liquid through the interior of the measuring cell since they are motor driven.

It will also be readily apparent that the various components of the measuring cell can be manufactured very inexpensively and that the construction of the cell can be accomplished with a minimum of expenditure of time because of its straightforward design.

Various modifications can be made to the construction of the present invention, and accordingly, it is not desired to be limited except as defined in the following claim.

What is claimed is:

1. An apparatus for the measurement of residual oxidizing agent in a flowing liquid comprising an enclosure establishing a measurement zone in the path of said flowing liquid, at least two hollow coaxial cylindrical electrodes within said enclosure having the inner portions of their surfaces exposed to said liquid flowing through said enclosure, a motor, a supporting member within said enclosure rotatable by said motor, said supporting member having at least one rod-shaped portion maintained parallel to and spaced from the axis of said coaxial cylindrical electrodes and rotatable about said axis, a plurality of ring-shaped members of insulating material having said rod-shaped portion extending through them in a loose fitting relationship such that their outer surfaces are thrown against the inner surfaces of the electrodes upon rotation of said supporting member, and means maintaining each said ring-shaped member in axial alignment with one of said cylindrical electrodes.

References Cited
UNITED STATES PATENTS

| | | | |
|---|---|---|---|
| 1,668,434 | 5/1928 | Todd | 324—30 |
| 3,051,631 | 8/1962 | Harbin et al. | 204—195 |
| 3,073,772 | 1/1963 | Wirz et al. | 204—195 |
| 3,155,603 | 11/1964 | Hart | 204—195 |
| 3,216,915 | 11/1965 | Arthur et al. | 204—195.1 |

JOHN H. MACK, *Primary Examiner.*

T. TUNG, *Assistant Examiner.*